United States Patent [19]
Ohms et al.

[11] Patent Number: 5,178,011
[45] Date of Patent: Jan. 12, 1993

[54] METHOD AND APPARATUS FOR BALANCING SUCCESSIVE ROTARY MEMBERS

[75] Inventors: Klaus-Peter Ohms, Darmstadt-Eberstadt; Jesus Varona, Darmstadt, both of Fed. Rep. of Germany

[73] Assignee: Gebr. Hofmann GmbH & Co. KG Maschinenfabrik, Pfungstadt, Fed. Rep. of Germany

[21] Appl. No.: 567,895

[22] Filed: Aug. 15, 1990

[30] Foreign Application Priority Data

Oct. 26, 1989 [DE] Fed. Rep. of Germany ....... 3935670

[51] Int. Cl.$^5$ ............................................. G01M 1/16
[52] U.S. Cl. .......................................... 73/462; 73/468
[58] Field of Search ............... 73/462, 468; 301/58 A; 29/901; 409/133; 408/2; 51/165.71

[56] References Cited

U.S. PATENT DOCUMENTS

| | | | |
|---|---|---|---|
| Re. 31,971 | 8/1985 | Gold | 73/462 |
| 2,779,217 | 1/1957 | Stovall | 73/462 |
| 2,810,307 | 10/1957 | Hack | 408/2 |
| 2,898,764 | 8/1959 | Kinsey et al. | 73/483 |
| 2,933,984 | 5/1960 | Hack | 29/901 |
| 2,988,918 | 6/1961 | King | 73/462 |
| 3,939,715 | 2/1976 | Davis | 73/462 |
| 4,018,087 | 4/1977 | Wenz | 73/462 |
| 4,262,536 | 4/1981 | Orem et al. | 73/462 |
| 4,442,712 | 4/1984 | Junck et al. | 409/133 |
| 4,741,210 | 5/1988 | Maus | 73/462 |
| 4,803,882 | 2/1989 | Schonfeld et al. | 73/462 |
| 5,046,361 | 9/1991 | Sandstrom | 73/462 |

FOREIGN PATENT DOCUMENTS

| | | | |
|---|---|---|---|
| 1160213 | 6/1957 | Fed. Rep. of Germany | 73/462 |
| 2411843 | 10/1975 | Fed. Rep. of Germany | 73/462 |

Primary Examiner—Herbert Goldstein
Assistant Examiner—Raymond Y. Mah
Attorney, Agent, or Firm—Cushman, Darby & Cushman

[57] ABSTRACT

In a method and an apparatus for balancing successive rotary members, an unbalance measuring operation is carried out in one or more planes on each rotary member which is rotated at a measuring speed in a measuring run within an overall unbalance measuring time for ascertaining the required number of items of measuring information in a plurality of repetitive measuring cycles. After the elapse of a fraction of the overall unbalance measuring time the unbalance measuring operation is interrupted for an interruption time for the purposes of permitting the performance of working operations which due to vibration caused thereby could result in falsification of the unbalance measurement results, then unbalance measurement is resumed, and further interrupted, and so on in a repetitive procedure to make up the overall measurement time.

7 Claims, 3 Drawing Sheets

METHOD AND APPARATUS FOR BALANCING SUCCESSIVE ROTARY MEMBERS

BACKGROUND OF THE INVENTION

Various procedures for balancing successive rotary members are carried out in automatically balancing machines, involving effecting an unbalance measuring operation in one or more planes on each rotary member which rotates during that operation at a given speed of rotation for measurement purposes, within a given unbalance measuring period in which the required items of measuring information are ascertained in a plurality of repetitive measuring cycles. Operating steps are then carried out on the rotary member to provide for balancing thereof. Automatically operating balancing machines of that kind are frequently associated with transportation assemblies or transfer tools with which the respective rotary members to be measured are introduced into the measuring station of the balancing machine and removed again therefrom and then transported away for further operations. As indicated above, a suitable balancing operation can be carried out on the rotary member after the conclusion of a measuring run and an unbalance measuring operation, and that may involve removing material from the rotary member by a suitable machining operation such as drilling or milling, or balancing weights may be secured to the rotary member. That balancing operation can be carried out in the measuring station itself or in a separate balancing station, still within the automatic balancing machine. However those working operations are inevitably such as to give rise to vibration which can affect the unbalance measuring operation in such a way as to falsify the measurement results thereof. The temporal succession of the individual working steps involved in that procedure such as transportation of the rotary member, measuring the rotary member unbalance and effecting the balancing operation is therefore controlled in automatic balancing machines in many cases in such a way that, during the unbalance measuring operation, there are no other movements taking place within the assembly, which would give rise to vibration. As the unbalance measuring operation takes from four to ten seconds, depending on the particular type of rotary member, in order to ascertain the required number of items of measuring information, it is difficult to provide a procedure, which is advantageous in respect of time, in regard to the individual maching steps which are to be carried out on the rotary member, in an automatically operating balancing system.

SUMMARY OF THE INVENTION

An object of the present invention is therefore that of providing a method of balancing rotary members, which affords an overall measuring period of adequate length for ascertaining the required number of items of measuring information in the unbalance measuring operation, while in addition the other processing steps to be carried out on the rotary member can be effected in the optimum fashion in regard to time, with the avoidance of measurement results being affected by vibration.

Another object of the present invention is to provide a method of balancing successive rotary members which provides for more rational integration of unbalance measuring steps and balancing steps, thereby to provide a more reliable measuring result in a reasonably short period of time.

Still another object of the present invention is to provide an apparatus for balancing successive rotary members, which operates in a rational fashion such as to provide a reliable measurement result without involving major additional complexities of structure.

In accordance with the present invention, in a first aspect, these and other objects are achieved by a method of balancing successive rotary members wherein an unbalance measuring operation is carried out in one or more planes on each rotary member, with the rotary member rotating during the unbalance measuring operation at a given measuring speed of rotation, within a given unbalance measuring time in which the required number of items of measuring information is ascertained in a plurality of repetitive measuring operations. The unbalance measuring operation is temporarily interrupted one or more times after the expiry of a respective fraction of the measuring time and one or more processing steps is carried out on the rotary member during the interruption time or times or on one or more of the other successive rotary members, with the unbalance measuring operation being continued after termination of the respective processing step on the rotary member, the sum of the fractions of the unbalance measuring times constituting the required measuring time for each rotary member.

In that procedure it is also possible for the rotor to be brought to a halt during the interruption in the unbalance measuring time, which can be referred to hereinafter as the interruption time.

In an advantageous embodiment of the method of the invention, the respective continuation of the unbalance measuring operation is carried out at the respective point of interruption, or phase of interruption, in the measuring cycle.

In accordance with another advantageous feature of the method of the invention, the rotary member continues to rotate at the appropriate measuring speed during the respective temporary interruptions in the unbalance measuring operations so that there is no time lost when making the transition from an interruption time to a subsequent unbalance measuring operation.

It will be seen that, during the interruption times, it is possible to carry out processing or machining steps on the rotary member to provide for balancing thereof, which give rise to vibration in the balancing arrangement. The processing steps involved may relate for example to transportation of the rotary member when passing it into an unbalance measuring station or transportation of the rotary member when removing it from the unbalance measuring station. In addition, operating steps for balancing the rotary member may be carried out during the interruption times. Those balancing operations may involve removing material from the rotary member by suitable machining thereof or applying balancing weights thereto.

Further in accordance with the invention, in a second aspect, the foregoing and other objects are achieved by an apparatus for balancing successive rotary members comprising an unbalance measuring station, with a transportation means for moving the rotary members and introducing them into an unbalance measuring station and transportation means for removing the rotary members from the unbalance measuring station and carrying them away. The apparatus further comprises balancing means for balancing of the measured rotary members, and a control means for providing control in respect of time of the successive operating steps to be carried out on the successive rotary members. The apparatus further includes a storage means for storing an angular value in respect of the angular position of the respective rotary member at the time of a temporary interruption in the unbalance measuring operation during a measuring run. After expiry of the interruption time the unbalance measuring operation can be resumed again when the rotary member is returned to its stored angular position contained in the storage means, upon further rotary movement of the rotary member.

It will be appreciated that the principles of the present invention can be employed in balancing systems of any configuration. For example, the invention can be employed in balancing systems for balancing motor vehicle wheels, or elongate rotary members such as crankshafts, which are transported by suitable gripper assemblies and transfer tools within the balancing machine, or when balancing clutches, grinding wheels, electric motor armatures and the like.

Further objects, features and advantages of the present invention will be apparent from the following description of preferred embodiments of the invention.

DESCRIPTION OF PREFERRED EMBODIMENTS

Figure 1:
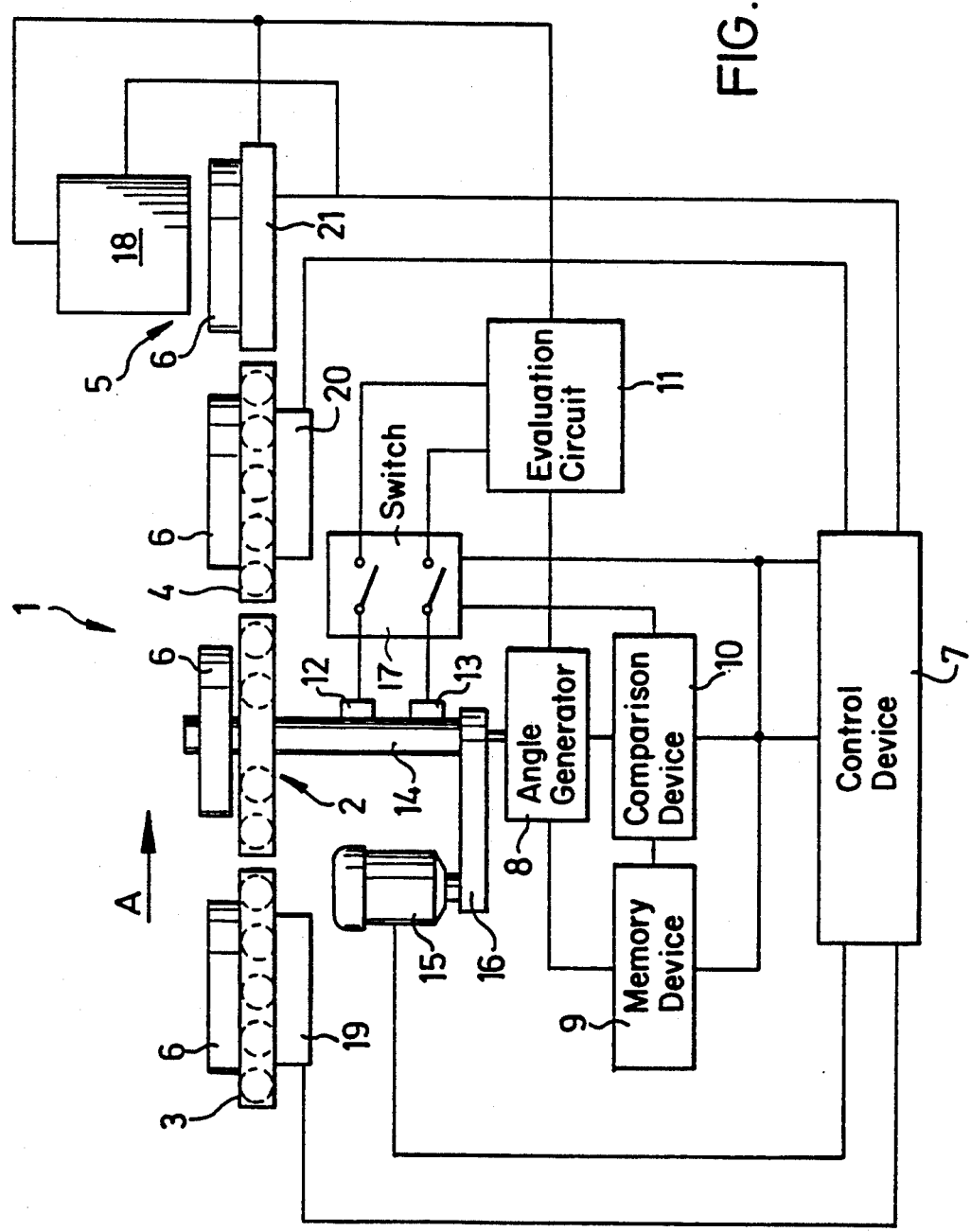
FIG. 1 is a diagrammatic view of a part of a balancing machine, as a first embodiment of the present invention.

Referring firstly to FIG. 1, shown therein is an embodiment of an apparatus 1 for balancing successive rotary members, comprising a transportation arrangement 3 with which successive rotary members as indicated at 6 are transported into an unbalance measuring station 2. After the unbalance measuring operation has been carried out on the rotary member 6 in the unbalance measuring station 2, the rotary members are successively removed again from the unbalance measuring station 2 by means of a further transportation arrangement 4, and passed into a downstream balancing station indicated generally at 5 for carrying out a balancing operation.

The transportation arrangements 3 and 4 can be in the form of roller beds, as diagrammatically shown in FIG. 1. It is also possible however to use other forms of transportation means such as what are known as circular transfer tools with which the successive rotary members 6 are moved along a circular path into the respective processing station of the assembly. Furthermore, when dealing with elongate rotary members such as crankshafts or drive shafts, it is possible to use various forms of gripper devices which are capable of moving the rotary members to be balanced into the respective operating positions required. Reference may be made to 'Hofmann News 20' for a number of transportation arrangements and transfer devices for displacing rotary members to be balanced, within an automatically operating balancing apparatus, and such assemblies can thus be used in connection with the illustrated construction of the invention.

The balancing station 5 may provide for carrying out various balancing procedures to put a rotary member into a satisfactory condition of balance. For example, the balancing station 5 may use cutting tools as indicated at 18, for removing material from the rotary member in dependence on the measured unbalance thereof. Suitable tools in that respect are milling cutters, grinders or drilling or boring tools. The balancing station 5 may also have a balancing device, once again at the location indicated at 18 in FIG. 1, comprising a means for securing one or more balancing weights to the rotary member to be balanced, at the appropriate one or more locations thereon. Reference may once again be made to 'Hofmann News 20' showing systems which can be used as balancing devices at the location indicated at 18.

In the unbalance measuring station 2, reference numeral 14 identifies a measuring spindle on which a rotary member 6 to be balanced is fixed by means of a suitable clamping arrangement. The measuring spindle is driven at the desired speed of rotation during a measuring run by a drive motor 15 by way of a transmission 16 which is preferably in the form of a belt transmission, so that the rotary member 6 rotates at the measuring speed of rotation. Measurement value generators 12 and 13 which can be in the form of travel-measuring or force-measuring measurement value generators detect the oscillations arising due to unbalance forces during a measuring run, and output appropriate unbalance measuring signals. The measurement value generators 12 and 13 can be selectively connected by way of a switching device 17 to an evaluation circuit 11 for the unbalance measuring signals supplied by the measurement value generators 12 and 13. Reference may be made to 'Hofmann News 5' and 'Hofmann info 2' to find suitable evaluation assemblies and circuits for the unbalance measuring signals.

The illustrated apparatus has a control device as indicated at 7 for controlling the time sequence of the individual operating steps involved in the procedure for balancing the successive rotary members 6. The control device is connected to drive arrangements 19 and 20 for the transportation arrangements 3 and 4 for transporting the rotary members 6 into the unbalance measuring station 2 and out of same again, and also to a suitable actuating device 21 in the balancing station 5. The actuating device 21 may include a rotary adjusting system with which the rotary member can be moved into the appropriate angular position required for a balancing operation to be carried out thereon. Suitable forms of such a rotary adjusting system are known and do not therefore need to be described in greater detail herein. In order to provide the information required for the balancing operation, concerning the unbalance on the rotary member 6, which has to be compensated by the balancing operation, the actuating device 21 and the balancing device 18 in the balancing station 5 are suitably connected to the evaluation circuit 11 as indicated by the lines representing connections in FIG. 1.

In the construction shown in FIG. 1 the measuring spindle 14 is also connected to an angle generator 8 which indicates the respective angular position of the measuring spindle 14 and thus therewith the rotary member 6 which is carried on the measuring spindle 14 in the unbalance measuring station 2. A storage device 9 or memory of a suitable nature is connected to the angle generator 8 while connected to the storage device 9 and the angle generator 8 is a comparison device 10.

The comparison device 10 and also the control device 7 control the switch device 17.

The mode of operation of the balancing apparatus 1 shown in FIG. 1 is as follows:

The rotary member 6 disposed in the unbalanced measuring station 2 is rotated at the required measuring speed of rotation by actuation of the drive motor 15. The control device 7 controls the switch device 17 in such a way that the measurement value generators 12 and 13 are connected to the evaluation circuit 11. The switch members of the switch device 17, which are shown in an open condition in FIG. 1, are then closed. During the unbalance measuring operation, unbalance measuring signals are supplied from the measurement value generators 12 and 13 to the evaluation circuit 11.

Figure 2:
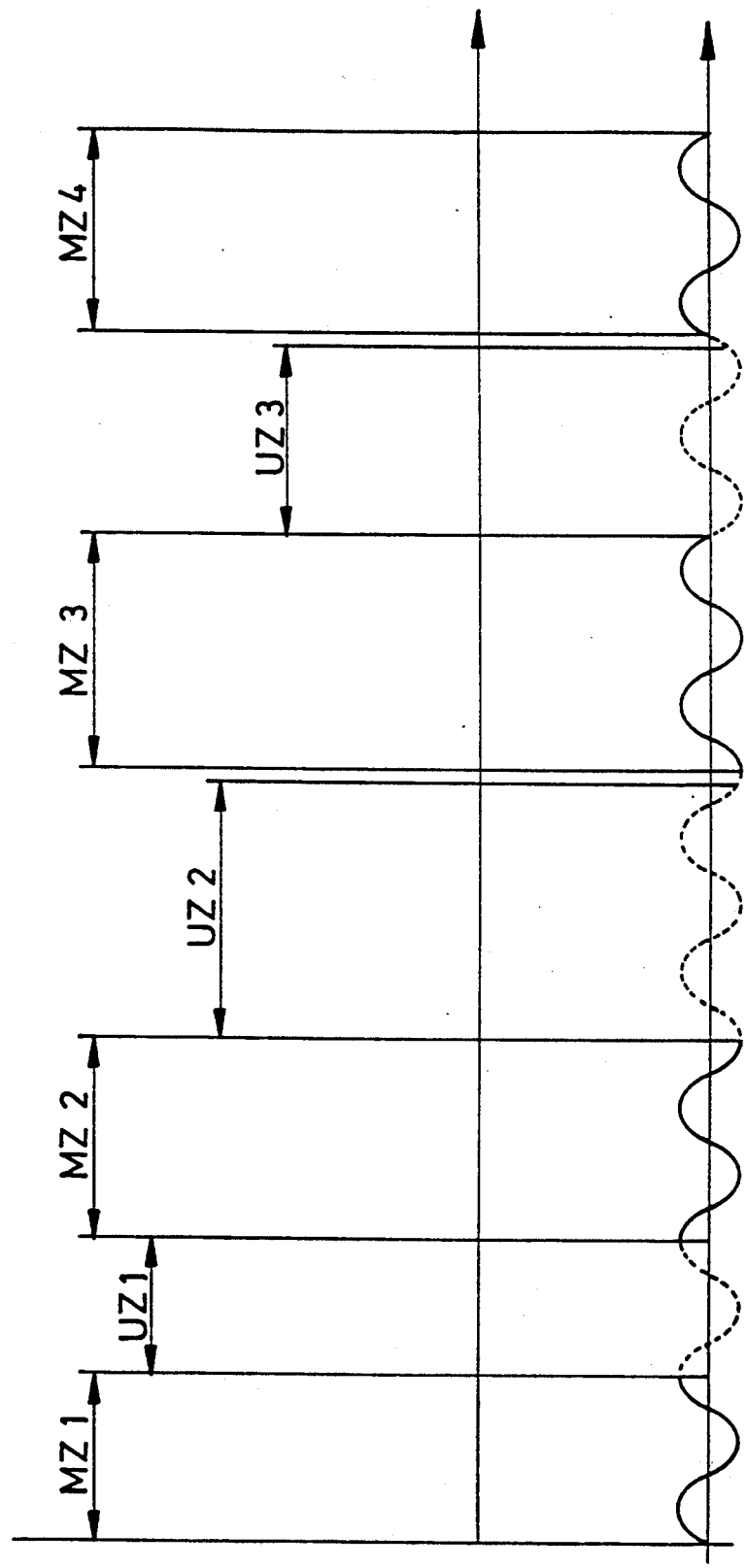
FIG. 2 illustrates the time sequence of various operating steps effected in a balancing machine in accordance with an embodiment of the invention.

Reference will be made at this point to FIG. 2 which diagrammatically shows an approximately sinusoidal unbalance measuring signal on the x-axis representing the angle of rotation of the rotary member. During a measuring run, a plurality of periods of such a signal must be detected in order to obtain adequate information about the unbalance values contained in the signal, by sampling and in particular by digital evaluation. In order to be able to carry out with the illustrated construction other procedures which give rise to vibration in the balancing apparatus 1, which vibration could tend to falsify the measurement results thereof, the procedure of the present invention involves interrupting the measuring operation after the expiry of a fraction of the measurement time, as indicated at MZ1 in FIG. 2. For that purpose, the switch members of the switch device 17 in the embodiment illustrated in FIG. 1 are moved into the opened position shown in FIG. 1 by actuation of the control device 7. At that interruption time, the storage device 9 is also actuated by the control device 7 so that the instantaneous value of the angular position adopted by the rotary member 6 at the time at which the switch members of the switch device 17 are opened is put into store in the storage device 9, from the angle generator 8. The rotary member which is clamped in position on the measuring spindle 14 in the unbalance measuring statio 2 continues to be driven by the drive motor 15 at the measuring speed of rotation. During the interruption time indicated at UZ1 in FIG. 2, in the measuring operation, for example a balancing operation can be carried out in the balancing station 5 on another rotary member 6 which is accommodated therein. When that balancing operation has been concluded, the control device 7 again actuates the switch device 17 to close the switch members thereof so that the measurement value generators 12 and 13 are again connected to the evaluation circuit 11 for the measurement of unbalance of the rotary member 6 in the unbalance measuring station 2, and the unbalance measuring operation on that rotary member is then continued. The unbalance measuring operation which now takes place once again occurs only during a fraction as indicated at MZ2 in FIG. 2 of the entire measuring period required.

As can be seen from FIG. 2, the fresh unbalance measuring operation begins at a time at which the rotary member 6 in the unbalance measuring station 2 is in the same angular position as that which it adopted when the unbalance measuring operation was brought to an end at the expiry of the first fraction MZ1 of the measuring time. To achieve that, the construction shown in FIG. 1 includes the comparison device 10 which is connected to the angle generator 8 and the storage device 9. When the control device 7 has established that the corresponding rotary member processing step has been concluded, in other words, in the above-discussed situation the rotary member balancing operation in the balancing station 5 has been concluded, the control device 7 actuates the comparison device 10. When the value of the angle of rotation detected by the angle generator 8 for the rotary member 6 which continued to rotate in the unbalance measuring station 2 during the interruption time UZ1 coincides with the value of the angle as stored in the storage device 9, the comparison means 10 outputs an output signal which closes the switch members in the switch device 17 so that, as already mentioned, the measurement value generators 12 and 13 are connected to the evaluation circuit 11 in order for the unbalance measuring operation to be continued during the measuring time fraction MZ2.

Now, so that the rotary member which is balanced in the balancing station 5 can be removed from the balancing apparatus 1, the unbalance measuring operation being carried out on a rotary member 6 in the unbalance measuring station 2 is once again interrupted for an interruption time as indicated at UZ2 in FIG. 2. During that interruption time UZ2, the rotary member 6 which is on the transportation arrangement 4 and on which an unbalance measuring operation has already been carried out is moved into the balancing station 5. In that case once again the instantaneous value of the angle of rotation of the rotary member 6 in the unbalance measuring station 2, which value obtains at the end of the measuring time MZ2, is put into store in the storage device 9. When the interruption time UZ2 during which the rotary member is transported by the transportation arrangement 4 into the balancing station 5 is detected by the control device 7, the device 7 once again actuates the comparison device 10. At the time at which the value of the angle of rotation of the rotary member 6 fixed on the measuring spindle 14 corresponds to the angle value stored in the storage device 9, the comparison device 10 once again outputs an output signal by which the switch members in the switch device 17 are closed again. A further unbalance measuring time indicated at MZ3 in FIG. 2 then begins. That measuring time fraction MZ3 is interrupted once again so that, during the interruption time UZ3, the rotary member 6 disposed in the balancing station 5 can be moved into the angular position which is ascertained in relation thereto as being the angular position on the rotary member at which a balancing operation is to be carried out. For that purpose the actuating device 21 of the balancing station 5 is operated by the evaluation circuit 11. As soon as the rotary member 6 in the balancing station 5 has been turned into the appropriate angular position for a balancing operation to be carried out thereon, the conclusion of that rotary member setting process is in turn detected by the control device 7 and the comparison device 10 is then brought into operation, as already indicated above. The comparison device 10 in turn outputs an output signal when there is a condition of identity between the values in respect of angle generated by the angle generator 8 and stored in the storage device 9 respectively. That output signal once again causes the measuring value generators 12 and 13 to be connected to the evaluation circuit 11 and the remaining part of the necessary measuring time required for carrying out the entire unbalance measuring operation begins. That measuring time is indicated at MZ4 in FIG. 2. After the conclusion of the measuring time MZ4, the total measuring time which is required in order to obtain the necessary number of items of measuring information is also concluded, in the embodiment being described herein.

Reference will now again be made to FIG. 2 in which the x-axis constitutes the angle axis on which the measuring cycles during which an unbalance measuring operation is carried out are shown by solid lines while continuing rotation of the rotary member at the measuring speed of rotation is indicated in broken lines, during the interruption times UZ1, UZ2 and UZ3. FIG. 2 shows that, between the interruption times UZ2 and UZ3 and the respectively following unbalance measuring times MZ3 and MZ4 there are slight intermediate intervals of time, during which the rotary member which is fixed on the measuring spindle 14 in the unbalance measuring station 2 has continued to rotate into the appropriate angular position in which the respectively preceding unbalance measuring operation had been interrupted. In regard to the other transitions between the interruption times and the measuring times, there is no additional or intermediate period or hiatus of that kind.

It will be appreciated that it is also possible for a measuring procedure to be interrupted more frequently than that described above, for example if, during a balancing operation being carried out on a rotary member which is disposed in the balancing station 5, it is necessary to carry out a plurality of balancing operations in order to compensate for a plurality of unbalance components at different locations on the rotary member.

Figure 3:
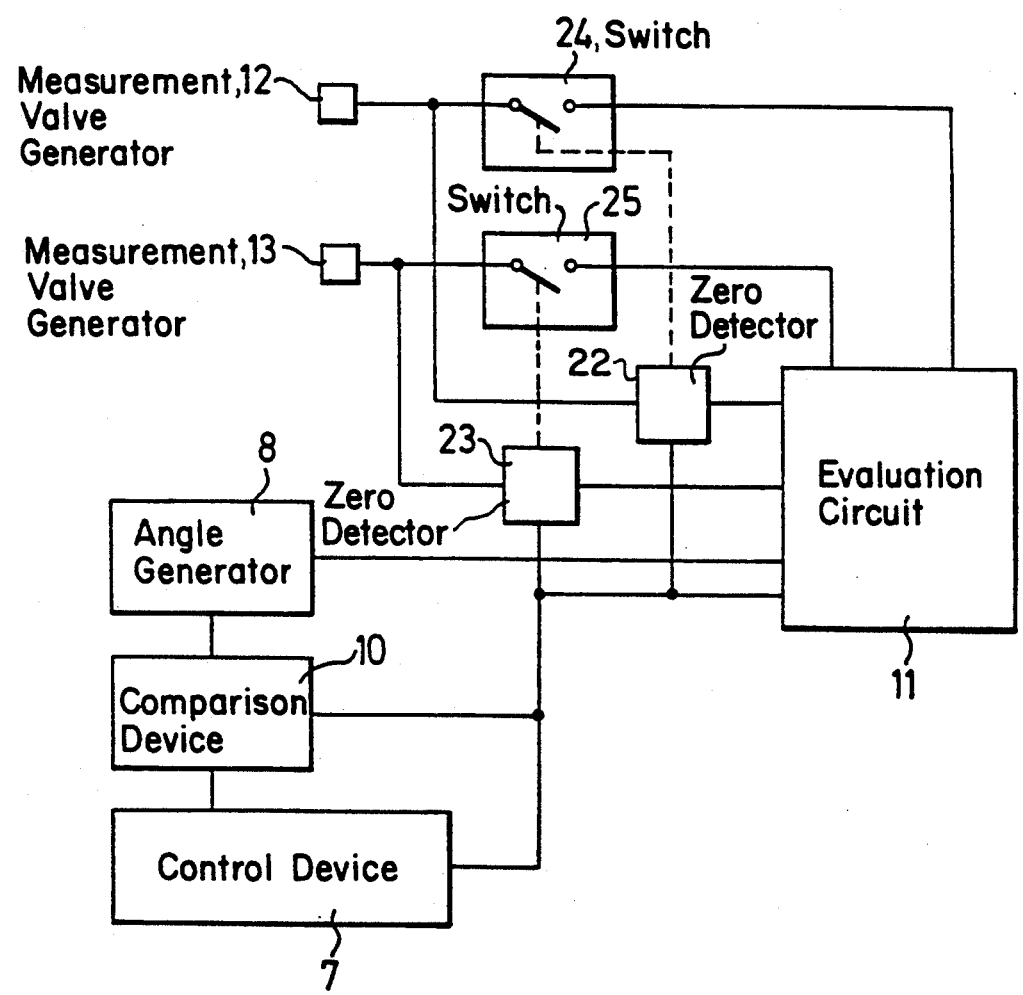
FIG. 3 is a highly diagrammatic view of a modified structure of the embodiment shown in FIG. 1.

It will further be appreciated from the foregoing description of the illustrated embodiment that the principles of the invention can advantageously be used in automatic balancing machines for a very wide range of different types of rotary members. The measuring configuration shown in FIG. 1 is preferably designed for dynamic unbalance measurement in first and second planes. Reference will now be made to FIG. 3 showing an embodiment of the rotary member balancing apparatus which includes passage-through-zero detectors 22 and 23 which are connected to the two measurement value generators 12 and 13 respectively. The detectors 22 and 23 detect the passages through zero of the measurement signals in respect of the unbalances measured on a rotary member. In that way it is possible to detect a phase difference between the measurement signals. As can be clearly seen from FIG. 3, the detectors 22 and 23 are linked to the evaluation circuit indicated at 11 while in addition the arrangement includes switches 24 and 25 whose inputs are connected to the measurement value generators 12 and 13 respectively and which are actuated by operation of the detectors 22 and 23. As a result, the phase difference exhibited by the two unbalance measurement signals supplied from the outputs of the measurement value generators 12 and 13 is taken into consideration upon opening and closing of the switches 24 and 25 to provide the interruption in the measuring operation and restoration of the measuring operation, as already discussed above in relation to FIG. 2. The measurement values which have already been accumulated are suitably stored and detected, for further operation of the arrangement. The two detectors 22 and 23 facilitate operation of the corresponding selector devices for that purpose.

It will be noted at this point that the construction of which only part is shown in FIG. 3 includes the same operating arrangement as the embodiment illustrated in FIG. 1.

It will be appreciated that the above-described constructions have been set forth solely by way of example and illustration of the principles of the method and apparatus of the present invention and that various modifications and alterations may be made therein without thereby departing from the spirit and scope of the invention.

We claim:

1. A method of balancing successive rotary members comprising the steps of:
   successively transporting each of the rotary members into an unbalance measuring station;
   successively rotating the rotary members in a measuring run at a measuring speed in the unbalance measuring station;
   successively effecting an unbalance measuring operation in at least one plane on each rotary member which rotates at the measuring speed within an overall unbalance measuring time wherein the required information about unbalance value and angle position is ascertained;
   successively transporting at least one of said rotary members from the unbalancing measuring station to a balance station, while at least one other of said rotary members remains in said unbalance measuring station;
   temporarily interrupting the unbalance measuring operation on said at least one other of said rotary members disposed in the unbalance measuring station for an interruption time after an elapse of a fraction of the overall unbalance measuring time;
   keeping said at least one other of said rotary members in the unbalance measuring station;
   performing the balancing operation on said at least one of said rotary members during the interruption time;
   resuming the unbalance measuring operation on said at least one other of said rotary members still disposed in the unbalance measuring station after said interruption time and after at least a portion of said balancing operation has been concluded; and
   repeating said method until the sum of said fractions makes up the overall unbalance measuring time with respect to said at least one other of said rotary members being subjected to the unbalance measuring operation.

2. A method as set forth in claim 1, wherein the angular position adopted by the rotary member being subjected to the unbalance measuring operation during the measuring run at said elapse of the fraction of overall unbalance measuring time is stored, and the unbalance measuring operation is resumed when the rotating rotary member reaches that stored angular position, after the respective interruption time.

3. A method as set forth in claim 1 wherein the rotary member being subjected to the unbalance measuring operation continues to be rotated at the measuring speed during the interruption time.

4. A method as set forth in claim 1 wherein the rotary member being subjected to the unbalance measuring operation is stopped during the interruption time.

5. Apparatus for balancing successive rotary members comprising:
   an unbalance measuring station including an inlet area, an unbalance measuring unit, a discharge area, and driving means for rotating a rotary member at a measuring speed while located in the unbalance measuring unit for effecting an unbalance measuring operation within an overall unbalancing measuring time, said unbalance measuring unit further including a controlled switch device;

first transportation means for moving rotary members through the unbalance measuring station;

a balance station for carrying out a balancing operation on rotary members;

second transportation means for moving a rotary member from the discharge area to the balancing station; and a timing control device controlling in a successive and repetitive manner:

(1) the opening of said switch device for interrupting the unbalance measuring operation being undertaken on a rotary member for an interruption time, after the elapse of a fraction of the overall unbalance measuring time, (2) the initiation of at least a portion of the balancing operation on another rotary member disposed in the balancing station during the interruption time, and thereafter terminating the balancing operation and actuating said switch device for resuming the unbalance measuring operation after said interruption time until the sum of said fractions makes up the overall unbalance measuring time with respect to that rotary member disposed in the unbalancing measuring unit.

6. Apparatus as set forth in claim 5, further including:

an angle detecting means for monitoring the responsive angular position of the rotary member rotating in the unbalance measuring station;

a storage device being connected to said angle detecting means; and a comparison device connected to the angle detecting means and the storage device and said timing control device, said unbalance measuring unit including measurement value generators for supplying unbalance measurement signals and an evaluation circuit for evaluation of unbalance value and angle position received from the unbalance measurement signals, said controlled switch device being connected between the measurement value generators and the evaluation circuit and operably connected to the comparison device, said storage device being actuated by said timing control device for storing the instantaneous value of the angular position of the rotary member at the time of interrupting the unbalance measuring operation after the elapse of the fraction of the overall unbalance measuring time, said comparison device being actuated by the timing control device after the balancing operation has been concluded to compare said stored instantaneous value of the angle position with the respective angular position of the rotary member rotating in the unbalance measuring station, the switch device being actuated to connect the evaluation circuit to the measurement value generators when the angular position of the rotating rotary member coincides with the stored instantaneous value of the angular position in the storage device.

7. Apparatus as set forth in claim 6 further including passage-through-zero detectors connected to the measurement value generators being operable to detect the passage through zero of the unbalanced measurement signals and thus a phase difference between the unbalanced measurement signals, and a switch associated with each measurement value generator, each switch also being adapted to be actuated in dependence on the detected phase difference between the unbalanced measurement signals.

* * * * *